United States Patent
Frisch

(10) Patent No.: US 7,156,985 B1
(45) Date of Patent: Jan. 2, 2007

(54) BIOREACTOR SYSTEM HAVING IMPROVED TEMPERATURE CONTROL

(75) Inventor: Samuel Frisch, Manalapan, NJ (US)

(73) Assignee: Shaw Intellectual Property Holdings, Inc., Baton Rouge, LA (US)

( * ) Notice: Subject to any disclaimer, the term of this patent is extended or adjusted under 35 U.S.C. 154(b) by 151 days.

(21) Appl. No.: 10/892,965

(22) Filed: Jul. 16, 2004

(51) Int. Cl.
*C02F 3/00* (2006.01)

(52) U.S. Cl. ............... 210/150; 210/151; 210/194; 210/195; 210/197

(58) Field of Classification Search ........ 210/150–151, 210/194, 196–197
See application file for complete search history.

(56) References Cited

U.S. PATENT DOCUMENTS

| | | |
|---|---|---|
| 3,169,575 A | 2/1965 | Engalitcheff, Jr. |
| 3,865,911 A | 2/1975 | Lefevre |
| 4,476,065 A | 10/1984 | McKey |
| 4,715,871 A | 12/1987 | Uratani |
| 4,804,503 A | 2/1989 | Komiya |
| 4,936,996 A | 6/1990 | Messing |
| 4,974,422 A | 12/1990 | Kocher |
| 5,413,713 A | 5/1995 | Day et al. |
| 5,494,577 A | 2/1996 | Rekers |
| 5,558,774 A | 9/1996 | Tonelli et al. |
| 5,612,219 A | 3/1997 | Rodicio et al. |
| 5,744,351 A | 4/1998 | Bryan-Brown |
| 5,750,028 A | 5/1998 | Frisch |
| 5,788,842 A | 8/1998 | Frisch |
| 5,821,114 A | 10/1998 | Barshter et al. |
| 5,861,303 A | 1/1999 | Barshter et al. |
| 5,984,580 A | 11/1999 | Ham et al. |
| 6,331,251 B1 | 12/2001 | Del Vecchio et al. |
| 6,364,572 B1 | 4/2002 | Hudgins et al. |
| 6,387,267 B1 | 5/2002 | Kantardjieff |
| 6,446,941 B1 | 9/2002 | Maheshwari et al. |
| 2001/0001065 A1 | 5/2001 | Kohr |
| 2002/0195729 A1 | 12/2002 | Merrill et al. |
| 2003/0068813 A1 | 4/2003 | Rietschel et al. |
| 2004/0137610 A1* | 7/2004 | Park et al. ............... 435/299.1 |

* cited by examiner

*Primary Examiner*—Chester T. Barry
(74) *Attorney, Agent, or Firm*—Henry E. Naylor; Kean, Miller, Hawthorne, D'Armond, McCowan & Jarman, LLP

(57) ABSTRACT

A bioreactor system having improved temperature control wherein heat is directly removed from the bioreactor liquid to maintain temperature balance in the bioreactor. The present invention also relates to a method for maintaining a desired temperature range of thermophilic and mesophilic bioreactors wherein ambient air is brought into direct contact with droplets of bioreactor liquid. Heat is transferred from the droplets of bioreactor liquid to the air, which is then evacuated from the bioreactor.

9 Claims, 3 Drawing Sheets

BIOREACTOR SYSTEM HAVING IMPROVED TEMPERATURE CONTROL

FIELD OF THE INVENTION

The present invention relates to a bioreactor system having improved temperature control wherein heat is directly removed from the bioreactor liquid to maintain temperature balance in the bioreactor. The present invention also relates to a method for maintaining a desired temperature range of thermophilic and mesophilic bioreactors wherein ambient air is brought into direct contact with droplets of bioreactor liquid. Heat is transferred from the droplets of bioreactor liquid to the air, which is then evacuated from the bioreactor.

BACKGROUND OF THE INVENTION

Wastewater streams containing organic and/or inorganic contaminants present a disposal problem for many industries. Non-limiting examples of such industries include agricultural, petrochemical, pharmaceutical, food processing, paper-mill, textile, and landfill industries. Contaminants found in these streams are typically undesirable organic compounds, including hydrocarbons, that must be removed, or decomposed, to an appropriate level prior to releasing the stream into the environment. Increasingly stricter environmental regulations demand increasingly higher standards for treating wastewater streams.

The food processing industry, for example, is in need of cost-effective treatment technologies for removing organic matter, measured as biochemical oxygen demand (BOD), and nitrogen from food processing wastewater streams that often contain relatively high levels of suspended solids and nitrogen compounds.

Enforcement of wastewater discharge regulations and escalating sewage surcharges have forced the food processing industry to look for cost-effective technologies for providing pretreatment, or complete treatment, of their wastewater streams. Historically, food processors located within or adjacent to municipalities have relied on local publicly owned treatment works for their wastewater treatment and disposal. Increasingly, this option is becoming less available. Because of dwindling federal grants for constructing new and upgrading existing publicly owned treatment works, municipal and regional sewer authorities are applying more pressure on private industries to reduce their organic, BOD and chemical oxygen demand (COD), and solids loading to sewers. Food processing wastewaters are particularly targeted because of their high BOD concentrations, especially high-strength wastewaters having high levels of suspended solids, ammonia and protein compounds. Thus, food processors are in need of cost-effective and application-specific treatment technologies to more effectively manage their wastewater streams.

The primary means of reducing BOD in food processing wastewater streams, as well as waste streams from many other industries, is by biological treatment. Biological treatment for such streams are typically categorized as aerobic, anaerobic, or a hybrid wherein a sequential aerobic-anaerobic treatment is used. Each such method can be either thermophilic or mesophilic. Non-limiting examples of aerobic technologies include trickling filter, activated sludge, rotating biological contactors, oxidation ditch, sequencing batch reactoras well as controlled wetlands. A bioreactor operated at mesophilic conditions will typically be operated within a temperature range of about 5 to 40° C., whereas a bioreactor operated at thermophilic conditions will be operated at about 55°±10° C.

While bioreactors, such as thermophilic bioreactors, have been proposed for the treatment of wastewater streams, they still face considerable challenges, such as a way to effectively maintain a desired temperature range of the biomass during operation.

SUMMARY OF THE INVENTION

In accordance with the present invention, there is provided a bioreactor system comprised of:
a) a bioreactor vessel characterized as having a chamber defined by enclosing walls, a roof, and a floor, wherein said bioreactor vessel contains at least one inlet port for receiving a liquid feedstream contaminated with a biodegradable contaminant, and at least one outlet port for removing bioreactor contents;
b) a heat transfer zone comprised of:
  i) a first conducting means for conducting ambient air into said heat transfer zone;
  ii) a second conducting means for conducting bioreactor liquid to said heat transfer zone; and
  iii) a distribution means for distributing the conducted bioreactor liquid into said heat transfer zone; and
c) at least one vapor outlet port in the bioreactor for exhausting air from the bioreactor.

In a preferred embodiment the first conducting means is a motor operated fan.

In another embodiment of the present invention the second conducting means is a mechanical pump.

Also is accordance with the present invention there is provided a bioreactor system comprised of:
a) a bioreactor vessel characterized as having a chamber defined by enclosing walls, a roof, and a floor, wherein said bioreactor vessel contains at least one inlet port for receiving a liquid feedstream having a biodegradable contaminant, and at least one outlet port for removing bioreactor contents;
b) a heat transfer zone comprised of:
  i) a first conducting means for conducting ambient air into said heat transfer zone;
  ii) a second conducting means for conducting bioreactor liquid to said heat transfer zone; and
  iii) a distribution means for distributing the conducted bioreactor liquid into said heat transfer zone;
c) at least one vapor outlet port in the bioreactor for exhausting air from the bioreactor; and
d) a solid/liquid filtration unit.

In a preferred embodiment, the solid/liquid filtration unit is a membrane filter that provides a permeate stream and a concentrate stream.

There is also provided a method for biodegrading organic contaminants of a wastewater stream in a bioreactor system containing a bioreactor system having a heat transfer zone, which method comprirses:
a) conducting said wastewater stream to a bioreactor containing microoragnisms that are effective to decompose at least a portion of said organic contaminants;
b) operating said bioreactor a temperature to cause the biodegradation of at least a portion of the organic contaminants of the wastewater stream, thereby resulting in the temperature of the bioreactor contents to rise;
c) monitoring the temperature of the bioreactor contents;
d) activating a first conducting means when a predetermined maximum temperature of the bioreactor contents is reached;

c) conducting ambient air into said heat transfer zone;

d) conducting bioreactor liquid from said bioreactor to said heat transfer zone;

f) distributing said conducted bioreactor liquid throughout said heat transfer zone so that said bioreactor liquid comes into contact with said conducted ambient air thereby resulting in heat being transferred from said distributed bioreactor liquid to said air and resulting in cooled bioreactor liquid;

g) exhausting said heat transferred air from said bioreactor; and h) recycling at least a portion of said cooled bioreactor liquid back to said bioreactor; and i) deactivating said first conducting means when a predetermined minimum temperature of said bioreactor contents is reached; and j) repeating steps d) through i) as the temperature of the bioreactor contents moves back and forth from said predetermined maximum and predetermined minimum.

DETAILED DESCRIPTION OF THE INVENTION

Any of several types of bioreactors can be used in the practice of the present invention. Non-limiting examples of bioreactors suitable for use herein include suspended growth reactors, including membrane bioreactors; standard continuously stirred tank reactors (CSTRs); and activated sludge systems. Preferred are membrane bioreactors. Alternatively, fixed film reactors, such as fluidized bed reactors or fixed support reactors, can also be used.

Bioreactions often generate heat, thereby requiring a means for maintaining the bioreactor liquid within a relatively narrow operating temperature window to support the desired bioreactions. For example, the preferred operating temperature of a thermophilic bioreactor of the present invention will be about 55° C.±10° C., and about 5 to 40° C.±10° C. for a mesophilic reactor. The bioreactor system of the present invention, which is preferably a membrane bioreactor system, maintains a predetermined temperature range of the bioreactor contents by direct heat transfer from the bioreactor liquid to air that is conducted into a heat transfer zone associated with the bioreactor to receive this transfer of heat. The resulting heated air is then evacuated from the bioreactor system as exhaust air.

Figure 1:
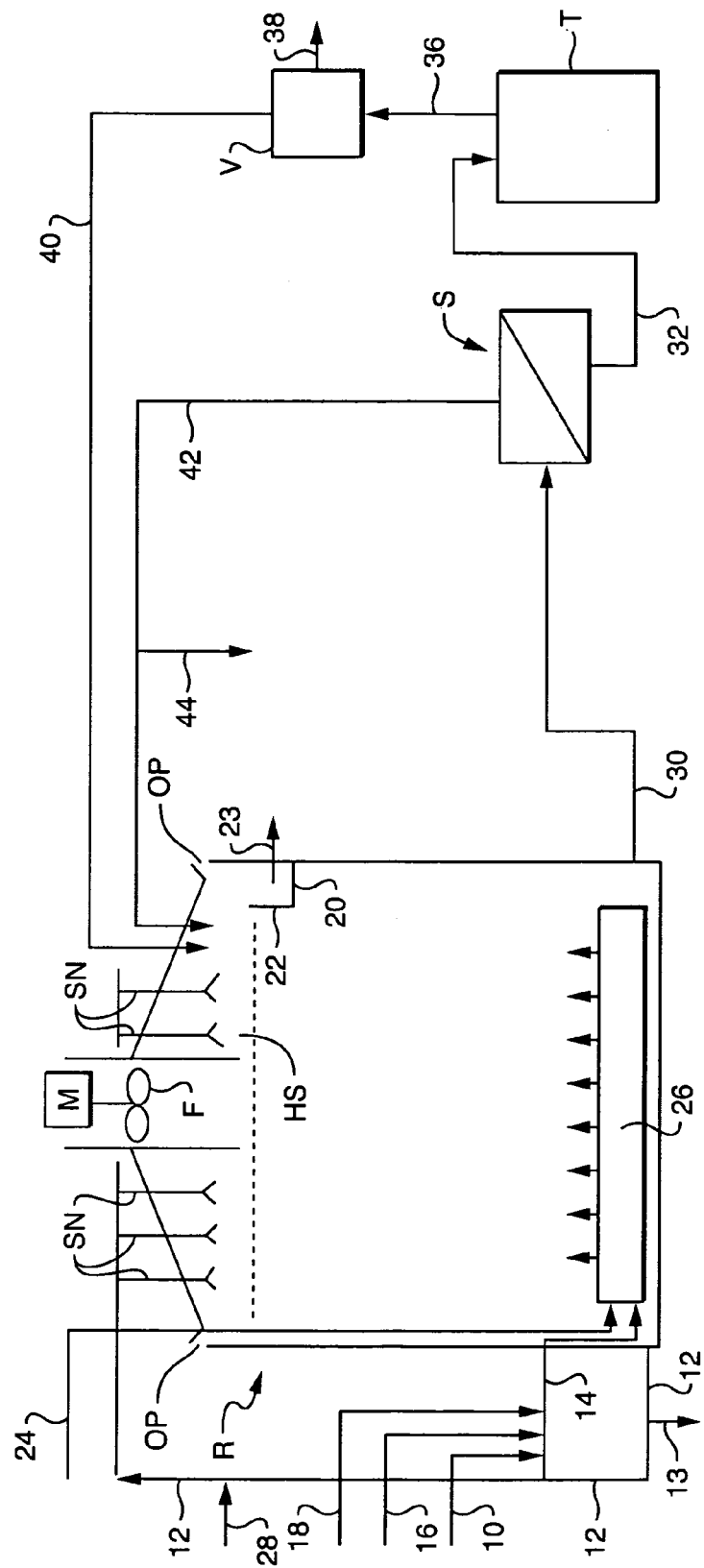
FIG. 1 hereof is a representation of a preferred membrane bioreactor system of the present invention.

The present invention can be better understood with reference to the figures hereof. FIG. 1 is a schematic of one preferred process scheme for practicing the present invention. Various ancillary pieces of equipment, such as pumps, valves, instrumentation etc. are not shown in these figures because they are well known in the art. Further, the scope of this invention is not intended to be limited by the embodiments shown in the figures hereof. The figures hereof are not in scale, but represent the main elements of preferred embodiments. The wastewater feed stream to be treated is introduced via line 10 into bioreactor R which is shown as a suspended growth reactor. Suspended growth processes are also sometimes referred to as activated sludge type processes where substantially free flowing biological flocks are suspended by aeration in a liquid phase throughout the reactor, thus providing optimal contact of the flocks with the required air and contaminants dissolved in the water. A fluidized bed bioreactor can also be used in the practice of the present invention, which fluidized bed will contain a slurry of liquid, media, and biomass. It is preferred that the reactor be cylindrical in shape. The feed stream is shown in this figure as being introduced via line 10 into a bioreactor liquid recycle stream that is removed from the bioreactor via line 12 and returned to the reactor via line 14. It will be understood that the feed stream can be introduced into the bioreactor at any other suitable location in the bioreactor system, including being introduced directly into the mixing/aeration assembly 26. Line 12, which will be discussed in more detail later, serves to conduct bioreactor liquid to be cooled to a suitable distribution means, preferably spay nozzles designated SN, and can also serve to remove excess biomass from the reactor via line 13.

Operation of the bioreactor can be done in two phases: an initial batch operation followed by continuous operation. A batch operation is used to produce large amounts of degradative biomass within the reactor system, and to acclimate the degradative organisms to the contaminant feed. For example, the batch operation can be initiated by inoculating with an effective amount of microorganisms that are capable of biodegrading the target contaminant(s), then introducing a suitable carbon source (typically the feed) to increase cell population. It is within the ordinary skill of those in the art to select a suitable seed culture for the target contaminant(s). A wide variety of microorganisms for use in bioreactors is commercially available. Commercially available growth media can also be used to effect an increase in cell population. Non-limiting examples of such growth media include: Lauria broth (Gibco/BRL); Trypticase soy agar (BBI; Bectin/Dickinson, Cockyville, Md.); R2A (Difco Laboratories, Detroit, Mich.); and nutrient broths, including casamino acids and/or yeast extract. The microorganisms are allowed to grow, and when sufficient degradation rates are achieved, the reactor can be operated in a continuous mode at design conditions.

The reactor can be operated during both batch and continuous mode at the preferred target temperature, which, for thermophillic conditions, will be at about 55° C.±10° C., and at a target pH. The pH can be controlled by introducing a suitable acid or base via line 16. Non-limiting examples of suitable bases include soda ash, or an alkali solution, particularly one of NaOH or KOH. Suitable acids include sulfuric or hydrochloric acids.

Nutrients for the microorganisms can be added to the reactor via line 18. One preferred type of nutrient that may be used in the bioreactor system of the present invention is a water soluble fertilizer. In preferred embodiments, the fertilizer or other suitable nutrient source, supplies nutrients at a ratio of about 100 parts carbon to about 10 parts nitrogen to about 1 part phosphate (100:10:1). Examples of fertilizers acceptable in the practice of the present invention include fish oil emulsions or any other soluble agricultural fertilizer, such as Agway 20—20—20 or Lesco 19—19—19, ammonium chloride or ammonium nitrate-based fertilizers and potassium and sodium phosphate-based fertilizers. The liquid level in the bioreactor is controlled by use of any suitable equipment available in the art. For purposes of this FIG. 1 the liquid level is, preferably controlled by adjusting membrane permeate flow rate via line 38.

Mixing of the bioreactor medium and aeration is provided by the injection of air and recirculated bioreactor contents via lines 24 and 14 respectively to mixing/aeration assembly 26. The mixing/aeration assembly can be of any suitable conventional design used to distribute air at the bottom of the reactor. Such an assembly can be single pipe mounted to the floor of the bioreactor, or it can be an assembly of pipes interconnected. Of course the pipe(s) will have a suitable number and size hole to allow the distribution of air and/or liquid at the bottom of the bioreactor. Excessive foaming in the reactor is undesirable and the degree of foaming is monitored by conventional equipment (not shown). If excessive foaming occurs an antifoaming agent can be introduced into the bioreactor via line 28 into line 12 and sprayed at the top of the biomass via spray nozzles SN. Excessive foam can also be removed from the system via line 23 and overflow box defined by 20 and 22.

Bioreactor contents are removed from the bioreactor via line 30 and is conducted to solid/liquid separation zone S which is preferably a suitable filtration apparatus, preferably an ultrafiltration membrane, thereby resulting in a solids rich stream and a solids lean stream. The solids lean stream is typically referred as the permeate stream and the solids rich stream is typically referred to as the concentrate stream. It is preferred that the bioreactor contents being conducted via line 30 contain as high a level of solids as practical for the system, particularly for the separation unit. For example, if the separation unit is a membrane unit, then the level of solids will be primarily dependent on the designed flux through the membrane. That is, increased amounts of solids will result in a reduction in flux. It is within the scope of this invention that any other suitable liquid/solids separation device be used, such as a settling tank. The selection of the liquid/solids separation device is normally based on economic and operations considerations. The use of a membrane unit offers several benefits. For example, the retention of all suspended matter within the bioreactor leads to excellent effluent quality capable of meeting stringent discharge requirements and allowing for the possibility of direct water reuse. Also, since suspended solids are not lost in a clarification step, total separation and control of the solid retention time and hydraulic retention time are possible enabling optimum control of the microbial population and flexibility of operation. Several types of configurations of membranes can be used for membrane bioreactor applications. Non-limiting examples include tubular, plate and frame, rotary disk, hollow fiber, organic (polyethylene, polyethersulfone, polysulfone, polyolefin, etc.), metallic, and inorganic (ceramic) microfiltration and ultra-filtration membranes. The pore size of membranes suitable for use herein will range from about 0.01 to 0.4 μm and the fluxes will range from about 2 to 50 gallons per day per square foot of membrane area.

The resulting permeate is conducted via line 32 to holding tank T from where it can be directed to various places by passing it via line 36 to distribution valve V wherein at least a portion can be released as treated effluent via line 38, or conducted back to the bioreactor via line 40. The concentrate can also be conducted back to the bioreactor via line 42. It is within the scope of this invention to withdraw excessive biomass from the system via line 44. During biodegradation, the BOD of the feedstream is substantially reduced to levels that are acceptable for release as treated effluent. Waste streams to be treated in accordance with the present invention will typically have a BOD from about 3,000 to about 50,000 mg/l. After treatment they will typically have a BOD value of about 1 to 200 mg/l.

The temperature of the bioreactor contents is controlled by direct transfer of heat from the bioreactor liquid to ambient air. For example, when the temperature exceeds a predetermined maximum value, motor M is activated to turn fan F which draws an effective amount of ambient air into headspace HS defined by the space between the bioreactor content level L and the top, or roof, of the reactor. For purposes of this figure this headspace is used as the heat transfer, or cooling zone. At the same time, bioreactor liquid is conducted via line 12 with use of pump P to spray nozzles SN that are effective for producing spray droplets of a suitable size so that an effective liquid surface area is provided for effective heat transfer to occur. Heat is transferred to the air flowing through the head space HS. This air is then exhausted from the roof of the reactor via outlet ports OP. When the target temperature of the bioreactor contents is reached, motor M is deactivated. As previously mentioned, bioreactor contents flow to spray nozzles SN may continue for the secondary purpose of bioreactor foam control. This cycle is continuously repeated within a predetermined minimum and maximum temperature range (control temperature range). It will be understood that the temperature of the liquid in the bioreactor can also be influenced by such means as varying the speed of the fan or by varying the rate of flow of liquid in and out of the bioreactor.

Figure 2:
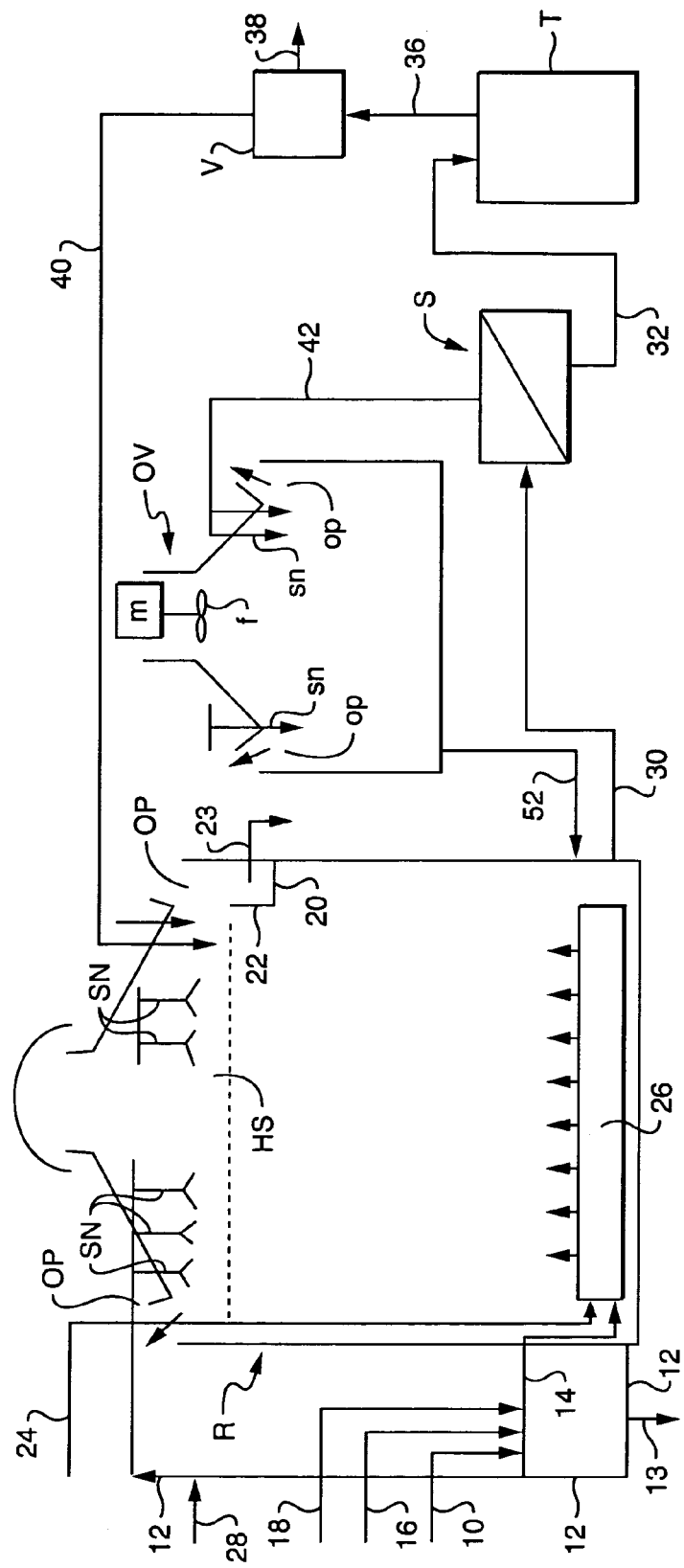
FIG. 2 hereof is a representation of an outboard vessel that is used as an alternative embodiment of the present invention for controlling temperature of bioreactor contents.
Figure 3:
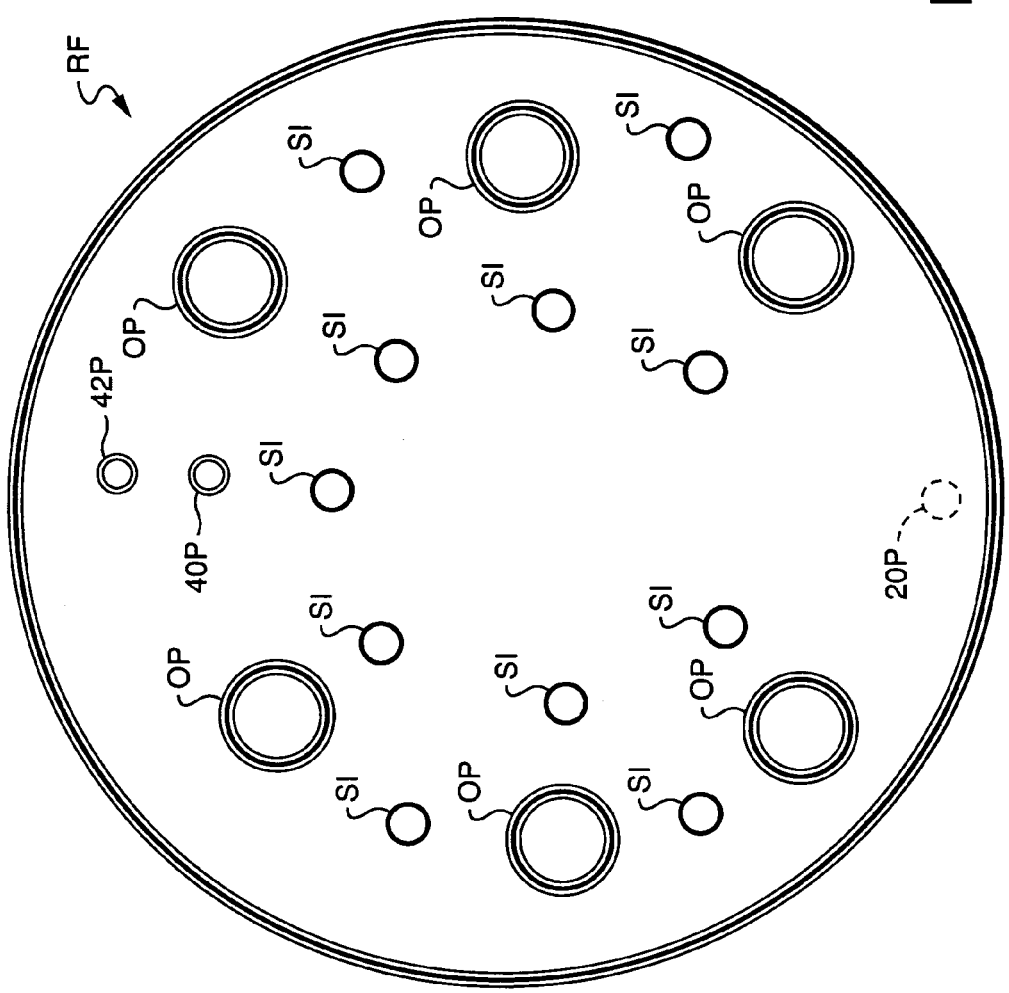
FIG. 3 hereof is a representation of the roof of the bioreactor of the present invention showing spray injection ports and air exhaust ports.

FIG. 2 hereof shows another preferred embodiment of the present invention for controlling the temperature of the contents of a bioreactor by directly transferring heat from the bioreactor liquid to air. All numbered items shown in FIG. 2 that were shown in FIG. 1 hereof have the same description and function except for the recycle bioreactor liquid conducted in FIG. 2 that is primarily used as an antifoaming function and not for controlling the temperature of the bioreactor. The temperature controlling function in FIG. 2 is shown in outboard vessel OV. Concentrate from separation zone S is conducted via line 42 to spray nozzles sn that distribute the concentrate in droplets of suitable size for effective heat transfer in a heat transfer of cooling zone. The concentrate stream is returned to reactor R via line 52. When the bioreactor contents reaches a predetermined maximum temperature, motor m is activated to turn fan f that draws an effective volume of air into outboard vessel OV to contact droplets of concentrate being sprayed through spray nozzles sn. Heat is transferred from the concentrate droplets to the air, which is evacuated from the vessel via outlet ports op. The resulting cooled concentrate is returned to reaction vessel R. When a predetermined lower temperature of the bioreactor contents is reached, motor m is deactivated and air ceases to be pulled into outboard vessel OV. The process is repeated as the temperature of the bioreactor contents fluctuates between its predetermined maximum and minimum limits.

FIG. 3 hereof is a non-limiting representation of the exterior view of the roof RF of a bioreactor of the present invention showing one embodiment of an arrangement of air outlet ports OP and spray injection ports SI. While this figure shows 6 air outlet ports and 11 spray injection ports it will be understood that fewer or more of each can be used in actual practice. Inlet ports 42P and 40P are shown for the recycle of permeate and concentrate respectively. Also shown is optional port 20P provided for an overflow weir flush nozzle if desired.

The invention claimed is:

1. A bioreactor system comprised of:
   a) a vessel having a chamber defined by an enclosing cylindrical wall having an upper cylindrical section, a middle cylindrical section, and a lower cylindrical section, a roof, and a floor, wherein said vessel contains at least one inlet port located within said lower cylindrical section of said cylindrical wall for receiving a feed stream containing a biodegradable contaminant and a first outlet port located within said lower cylindrical section of said cylindrical wall for removing bioreactor contents, a second outlet port located within said lower cylindrical section of said cylindrical wall, and a third outlet port located within said upper cylindrical section of said cylindrical wall, and a plurality of inlet ports through said roof;
   b) a heat transfer zone located within said vessel between said third outlet port and said roof, which heat transfer zone is comprised of:
      i) a first conducting means for conducting ambient air into said heat transfer zone;
      ii) a second conducting means for conducting bioreactor liquid into said heat transfer zone;
      iii) a distribution means comprised of a plurality of nozzles in fluid communication with said second outlet port for distributing the conducted bioreactor liquid in the form of droplets into said heat transfer zone; and
      iv) at least one vapor outlet port located in said roof of said vessel for exhausting air from the bioreactor.

2. The bioreactor system of claim 1 wherein the first conducting means is a motor operated fan.

3. The bioreactor system of claim 1 wherein said second conducting means is a mechanical pump.

4. The bioreactor system of claim 1 wherein the distribution means is a plurality of spray nozzles designed to create a fan spay pattern of liquid droplets when liquid is sprayed therefrom.

5. A bioreactor system comprised of:
   a) a first vessel having a chamber defined by an enclosing cylindrical wall having an upper cylindrical section, a middle cylindrical section, and a lower cylindrical section, a roof, and a floor, wherein said vessel contains at least one inlet port located within said lower cylindrical section of said cylindrical wall for receiving a feed stream containing a biodegradable contaminant and a first outlet port located within said lower cylindrical section of said cylindrical wall for removing bioreactor contents, a second outlet port located within said lower cylindrical section of said cylindrical wall, and a third outlet port located within said upper cylindrical section of said cylindrical wall, and a plurality of inlet ports through said roof;
   b) a heat transfer zone located within a second vessel outboard to and in fluid communication with said first vessel, which second vessel is comprised of enclosing walls and a roof and a floor, which heat transfer zone is comprised of:
      i) a first conducting means for conducting ambient air into said beat transfer zone;
      ii) a second conducting means for conducting bioreactor liquid into said beat transfer zone;
      iii) a distribution means comprised of a plurality of nozzles in fluid communication with said outlet for a concentrate stream of the solid/liquid filtration unit of c) below for distributing the conducted bioreactor liquid in the form of droplets into said heat transfer zone; and
      iv) at least one vapor outlet port located in said roof of said first and second vessel for exhausting air from the bioreactor; and
   c) a solid/liquid filtration unit in fluid communication with said bioreactor vessel, which filtration unit has an outlet for a resulting concentrate stream and an outlet for a permeate stream.

6. The bioreactor system of claim 5 wherein the first conducting means is a motor operated fan.

7. The bioreactor system of claim 1 wherein said second conducting means is a mechanical pump.

8. The bioreactor system of claim 5 wherein the distribution means is a plurality of spray nozzles designed to create a fan spay pattern of liquid droplets when liquid is sprayed therefrom.

9. The bioreactor system of claim 5 wherein the solid/liquid filtration unit is an ultrafiltration membrane unit.

* * * * *